United States Patent
Watson (10) Patent No.: US 11,016,988 B1
(45) Date of Patent: *May 25, 2021

(54) MATCHED ARRAY FLIGHT ALIGNMENT SYSTEM AND METHOD

(71) Applicant: Airspeed Systems LLC, Chicago, IL (US)

(72) Inventor: Craig M. Watson, Chicago, IL (US)

(73) Assignee: Airspeed Systems LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/067,133

(22) Filed: Oct. 9, 2020

Related U.S. Application Data (63) Continuation-in-part of application No. 16/875,297, filed on May 15, 2020, now Pat. No. 10,803,085, (Continued)

(51) Int. Cl.
*G06F 16/25* (2019.01)

(52) U.S. Cl.
CPC .......... *G06F 16/258* (2019.01); *G06F 16/252* (2019.01)

(58) Field of Classification Search
CPC .............. G06F 3/04817; G06F 3/0482; G06F 3/04845; G06F 16/252; G06F 3/0488;
(Continued)

(56) References Cited

U.S. PATENT DOCUMENTS

| 4,305,057 A | 12/1981 | Rolston |
| 4,669,303 A | 6/1987 | Henry |

(Continued)

FOREIGN PATENT DOCUMENTS

GB  2 027 227 A  2/1980

OTHER PUBLICATIONS

Badr, "Why Feature Correlation Matters . . . A Lot!", Towards Data Science Inc., Jan. 18, 2019, downloaded from internet website: https://towardsdatascience.com/why-feature-correlation-matters-a-lot-847e8ba439c4 on Apr. 23, 2019, 8 pages.
(Continued)

*Primary Examiner* — Etienne P Leroux
(74) *Attorney, Agent, or Firm* — Faegre Drinker Biddle & Reath LLP (57) ABSTRACT

A matched array technology system and method for displaying in a two-dimensional array the structured interaction between different parameters of an aircraft flight. Specific applications effectively support improved flight safety and greater fuel efficiency. Proxy values of flight metrics are defined and scaled so the axes of the array contain corresponding indicators resulting in a matched array and an embedded, unique alignment vector showing the relationships between different flight variables. The flight alignment system may be used with flight data that contain discontinuities and nonlinear reversions. Wherever values intersect, flight alignment system indicators can depict proximity to the alignment vector, as well as the direction and extent of adjustments to either or both selected flight metrics to achieve and maintain controlled flight.

24 Claims, 9 Drawing Sheets

Related U.S. Application Data which is a continuation-in-part of application No. 16/785,745, filed on Feb. 10, 2020, now Pat. No. 10,657,684, which is a continuation of application No. 16/679,840, filed on Nov. 11, 2019.

(60) Provisional application No. 62/781,915, filed on Dec. 19, 2018, provisional application No. 62/810,610, filed on Feb. 26, 2019.

(58) Field of Classification Search
CPC ......... G06F 2203/04803; G06F 40/134; G06F 16/258; G06C 23/00
See application file for complete search history.

(56) References Cited

U.S. PATENT DOCUMENTS

| | | |
|---|---|---|
| 5,299,455 A | 4/1994 | Mangalam |
| 5,382,954 A | 1/1995 | Kennedy, Jr. et al. |
| 5,823,479 A | 10/1998 | Nield et al. |
| 6,304,670 B1 | 10/2001 | Berestov |
| 6,486,799 B1 | 11/2002 | Still et al. |
| 6,982,655 B2 | 1/2006 | Vialleton et al. |
| 7,036,085 B2 | 4/2006 | Barros |
| 7,630,986 B1 | 12/2009 | Herz et al. |
| 7,707,061 B2 | 4/2010 | van der Linde |
| 7,904,848 B2 | 3/2011 | Coene et al. |
| 9,292,857 B2 | 3/2016 | Averbuch |
| 9,335,901 B1 | 5/2016 | Pantel |
| 9,483,162 B2 | 11/2016 | Mingione |
| 9,495,222 B1 | 11/2016 | Jackson |
| 9,788,031 B2 | 10/2017 | Meyer |
| 10,157,173 B2 | 12/2018 | Villani |
| 10,521,778 B2 | 12/2019 | Bull et al. |
| 10,565,599 B2 | 2/2020 | Rodkey |
| 10,770,181 B2 | 9/2020 | Bull et al. |
| 2004/0183699 A1 | 9/2004 | Vialleton et al. |
| 2006/0093222 A1 | 5/2006 | Saffer et al. |
| 2008/0082931 A1 | 4/2008 | Morrel-Samuels |
| 2009/0099894 A1 | 4/2009 | Carden et al. |
| 2010/0010968 A1 | 1/2010 | Redlich et al. |
| 2010/0113159 A1 | 5/2010 | Chapman et al. |
| 2011/0004504 A1 | 1/2011 | Ives et al. |
| 2012/0221788 A1 | 8/2012 | Raghunathan |
| 2015/0006415 A1 | 1/2015 | Xu et al. |
| 2015/0077592 A1 | 3/2015 | Fahey |
| 2016/0162478 A1 | 6/2016 | Blassin et al. |
| 2016/0371625 A1 | 12/2016 | Mosley et al. |
| 2017/0032017 A1 | 2/2017 | Morinaga et al. |
| 2017/0053623 A1 | 2/2017 | Purayil et al. |
| 2017/0075557 A1 | 3/2017 | Noble et al. |
| 2017/0090482 A1 | 3/2017 | Zammit-Mangion et al. |
| 2017/0168680 A1* | 6/2017 | Fourneau-Pelletier ..................... G06F 3/04817 |
| 2017/0170968 A1 | 6/2017 | Zhang et al. |
| 2017/0177808 A1 | 6/2017 | Irwin et al. |
| 2017/0178135 A1 | 6/2017 | Bull et al. |
| 2017/0206292 A1 | 7/2017 | Bennett et al. |
| 2018/0137541 A1 | 5/2018 | Yelton et al. |
| 2018/0165254 A1 | 6/2018 | Talati |
| 2018/0181693 A1 | 6/2018 | Yang |
| 2018/0350116 A1 | 12/2018 | Ruble et al. |
| 2019/0026681 A1 | 1/2019 | Polli et al. |
| 2019/0033861 A1 | 1/2019 | Groden et al. |

OTHER PUBLICATIONS

Buckingham et al., "Reinventing Performance Management," Harvard Business Review, Apr. 2015, 14 pages.

Notice of Allowance issued in related U.S. Appl. No. 17/120,818, dated Mar. 11, 2021, 8 pages.

PCT Search Report and Written Opinion issued in related application PCT/US2020/059951, dated Mar. 4, 2021, 11 pages.

\* cited by examiner

MATCHED ARRAY FLIGHT ALIGNMENT SYSTEM AND METHOD

CROSS-REFERENCE TO RELATED APPLICATIONS

The present application is a continuation-in-part of U.S. patent application Ser. No. 16/875,297, filed on May 15, 2020, now U.S. Pat. No. 10,803,085, which is a continuation-in-part of U.S. patent application Ser. No. 16/785,745, filed on Feb. 10, 2020, now U.S. Pat. No. 10,657,684, which is a continuation of U.S. patent application Ser. No. 16/679,840, filed on Nov. 11, 2019, which claims the priority benefit of U.S. Provisional Patent Application No. 62/781,915, filed on Dec. 19, 2018, and U.S. Provisional Patent Application No. 62/810,610, filed on Feb. 26, 2019, each of which is incorporated herein by reference in its entirety.

TECHNICAL FIELD

The present disclosure relates generally to electronic display of system performance, and more particularly to a method and computing system for aligning two variables relating to aircraft flight characteristics to produce a target result or acceptable range of results.

BACKGROUND

A number of operational systems depend on the alignment of two different measures to efficiently or safely produce desired results. Such operations generally require a human operator's expertise and continual evaluation of the two different variables, often viewed on different gauges involving different metrics, and relying on measurement, experience, or "feel," to keep the system within operational parameters that yield the desired outcomes. Examples include chemical processes in which an exact and dynamic combination of heat and pressure is required to produce a specific compound, or aircraft flight operations in which an exact and dynamic combination of airspeed and angle-of-attack can mean the difference between a safe landing and loss of control. Such joint optimization situations involve coordinating the changing values of differently-measured variables, adjusting them together over a defined range, and keeping them within required bounds until target outcomes are achieved. Ordinarily, a significant effort is required to keep the operating variables aligned, and in some cases, failure to do so can result in a range of operating failures, including wasted product or even explosions in chemical environments; and accidents on takeoff and landing in flight.

DRAWINGS

While the appended claims set forth the features of the present techniques with particularity, these techniques may be best understood from the following detailed description taken in conjunction with the accompanying drawings of which:

DETAILED DESCRIPTION

This disclosure is generally directed to a system and method for displaying (e.g., on a display device) in a two-dimensional array the structured interaction of two variables moving in tandem to achieve a target outcome (for example, balancing heat and pressure in a chemical reaction to yield a given compound). In various embodiments, the feasible values of the two system operating variables are represented by proxy values of X and Y scaled so that the range and interval of the X- and Y-axes are the same, and configured so that whenever the system is in an equilibrium or optimal state, the proxy value of X and equals the proxy value of Y. The resulting display has at least two distinct features: first, it forms a "matched array" of all operationally-relevant X,Y intersections, and second, the points at which the system is in equilibrium or at an optimum (the same points at which proxy values of X and Y are equal) all lie along a unique, clearly-delineated center diagonal of the displayed output (e.g., on a display device) referred to herein as the "alignment vector." Further, the system and method for extending the utility of the process to flights involving discontinuous or nonlinear reversions (where x can have multiple values of y) is addressed, including how the system is made to work in such environments by synthetically reconstructing the flight data to address these complexities.

According to an embodiment, wherever on the display X and Y intersect, cells of the display can reflect several indicators of use to system operators: the values of the underlying operating variables, their proximity to the optimal position along the alignment vector, and the direction and extent of adjustments needed to reach the alignment vector to achieve optimal system performance. The presentation of the display can be on a display device (such as a computer monitor) including a matrix with shading and colors reflecting values relative to the alignment vector.

In an embodiment, the matched array system indicates the proximity to or distance from the optimal position of the X,Y values with an audible warning. In one implementation, the output is in an airplane cockpit instrument, in which the audio warnings sound when the X,Y intersection is dangerously far from the alignment vector, and with instructions on what to do to return to the desired flight path.

In an embodiment, the matched array system operates in two modes: normative, as in the above examples, in which the monitor or instrument provides information to be acted upon; and positive, in which the system, acting on the same information, automatically makes the needed adjustments to move the system toward the operating state represented by the alignment vector.

According to various embodiments, a "matched array" system and method facilitates coordinated achievement of joint optimization results using a computerized display system and method that combines the two different metrics in one display, and articulating optimal settings along a unique "alignment vector." The result is easier achievement of more consistently optimal performance, even by less experienced users.

In an embodiment, the matched array system and method can also be applied to discontinuous and nonlinear relationships using additional analytical methods. Aircraft angle of attack is steeper on takeoff than on landing, where, counterintuitively, it almost matches the AOA in level flight. Representing these processes in a display requires smooth changes and discontinuous state transitions to be reflected in a shared visual environment.

Figure 1:
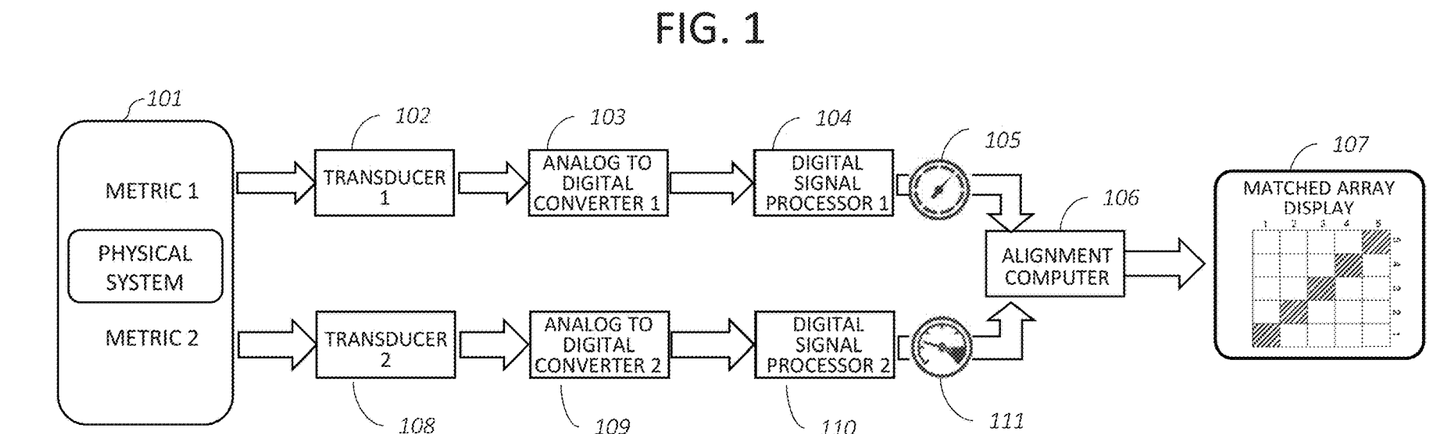
FIG. 1 is a representation of a matched array system receiving physical input (e.g., pressure, heat, or electrical inputs from a system such as a chemical or mechanical system), according to an embodiment.

Turning to FIG. 1, the operation of a matched array system according to an embodiment will now be described. In this embodiment, the matched array system receives physical input (e.g., pressure, heat, or electrical inputs from a system such as a chemical or mechanical system) from a physical system 101. The physical system 101 is similar to one that might be found in a chemical process in which the collected metrics indicate physical phenomena such a pressure, heat, or mechanical impulses. The physical input is received by a transducer 102, which translates it into analog electrical signals. These analog electrical signals are received by an analog-to-digital (A/D) converter 103, which converts the analog signals into digital signals. The digital signals are provided to a digital signal processor (DSP) 104, which processes (e.g., filters) the signals into a form that is usable by a meter 105 or other device for displaying measurements. The processed signal is also used by an alignment computer 106 (which can be implemented as a separate hardware processor such as a controller or microprocessor, or as a computing device such as that shown in FIG. 10) that analyzes the range of feasible values of x and (later) y to determine a corresponding set of proxy values that form the X and Y axes of a matrix display. The alignment computer 106 controls a display device 107 (to display a matched array). A parallel set of actions is taking place in in a second transducer 108, a second A/D converter 109, and a DSP 110, resulting in a signal 111 input to the alignment computer 106. The alignment computer 106 converts x and y metrics to proxy values that have the same range and interval on the X and Y axes, respectively. The display device 107 plots the proxy values as an intersection on the matched array (i.e., in response to actual metric 1 and 2 data received).

Figure 2:
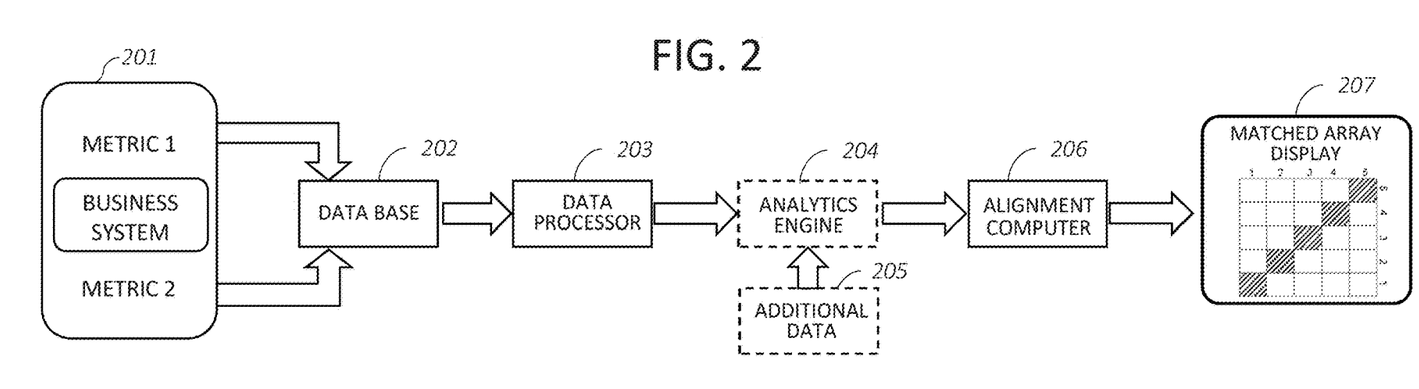
FIG. 2 is a representation of a matched array system receiving different data streams (from an administrative system), comparing them, and displaying them to optimize a process, according to an embodiment.

In FIG. 2, the operation of a matched array system according to an additional embodiment is illustrated. In this embodiment, the matched array system receives data (e.g., business or financial information) from a business system 201. A data base 202 receives metric 1 and metric 2 data from the business system and feeds them into a data processor 203 which modifies the data for meaningful manipulation in later stages (e.g., conversion to log numbers, multiplication by a relevant coefficient, formatting). In an embodiment, an additional optional step processes the two data elements through an analytics engine 204 that might also, for example, combine the data received with additional data 205, or otherwise enhance, interpret, or modify the data for processing by an alignment computer. The alignment computer 206 converts the two variables to proxy values that have the same range and interval on the X and Y axes, respectively, enabling them to be plotted together on a matched array display 207.

Figure 3:
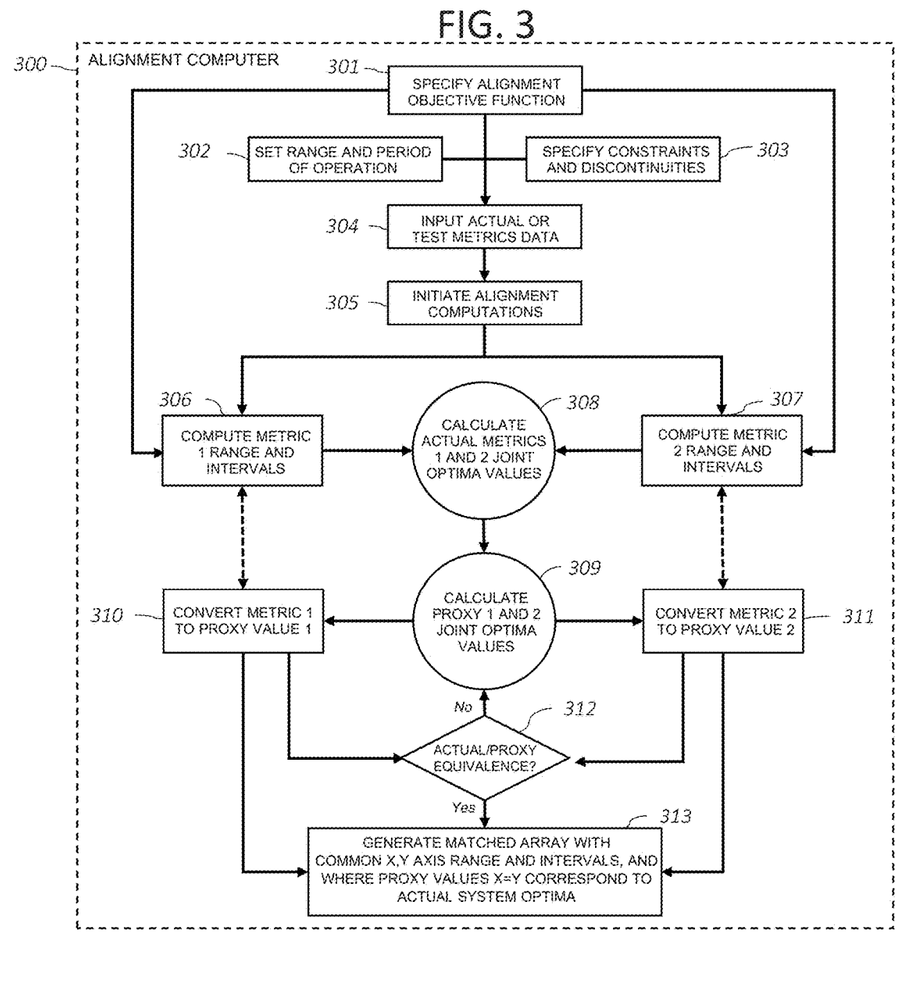
FIG. 3 is a process flow diagram showing steps involved in setting up a matched array system, according to an embodiment.

FIG. 3 portrays an "alignment computer" 300 and the series of actions it implements to calibrate the axes of the matched array system so that when the overall system is at an optimum or in equilibrium, proxy values for x and y are equal. The matched array system can portray optimum or equilibrium positions when two conditions are present: first, each proxy value axis X or Y must be able to represent the relevant range of the underlying operating metrics; and second, the range and interval of the proxy values are the same. When these conditions exist, intersection set x=y will lie along the center diagonal of a rectilinear array. When the system designer or alignment computer follows these guidelines, the matched array will be properly calibrated, and the settings will be applicable to the foreseeable functioning of the matched array system in much the same way that the scale of a car's speedometer does not have to be recalibrated for each trip.

In an embodiment in FIG. 3, a system designer or a microprocessor sets three specific conditions that support alignment computer operations: the operating system objective function 301 (e.g., product yield, aircraft flight orientation), the range and period of operation of the underlying operating system 302, and any constraints and discontinuities 303 that apply to the metrics of the underlying operating system. Together, these settings ensure that the matched array system can search and calculate proxy values within the appropriate feasible range of values for x and y when a system operator, or alternatively a microprocessor or transducer, introduces test or actual operating data to the matched array system database 304. In an embodiment, after receiving the data, or alternatively concurrent with the receipt of data, a system operator may manually, or a microprocessor may automatically, initiate the alignment computer process 305 based on the data received.

An alignment computer begins calculating the eventual alignment between proxy values for the actual operating metrics by first computing the range and interval of operating system metrics 1 and 2 in steps 306 and 307. The alignment computer then calculates at step 308 the subset of matched operating metric settings for which values the underlying system is stable or optimal in achieving the objective function specified in 301. Using the range and intervals of the operating metrics 1 and 2 of the underlying system, and the specific joint optima computed in step 308, the matched array computer calculates in step 309 the set of optimal proxy value combinations corresponding to the optimal operating metrics 1 and 2. Working from this set of optimal x and y proxy values, and incorporating the range and intervals reflected in the actual operating data, the alignment computer converts metric 1 and 2 operating data to proxy values 1 and 2 at steps 310 and 311. For purposes of the matched array, this process computes the values along the center diagonal—the alignment vector—and then identifies all related values (optimal or not) along the X and Y axes. The alignment computer calculates proxy values iteratively, checking that the proxy values correspond to the optimal operating values in step 312, and stopping when the equivalence between proxy and operating values has been established, indicating that the condition of proxy value equality at x=y corresponds directly to the optimality of the underlying operating system values ("proxy-operating equivalence").

When the alignment computer has established proxy-operating equivalence in step 312, all the conditions for specifying the matched array display 313 are established:
  a. the operating ranges and relevant intervals for metrics 1 and 2 have been identified;
  b. the subset of operating ranges and relevant intervals of metrics 1 and 2 values for which the operating system is stable, optimized, or at equilibrium have been identified;
  c. the corresponding set of optimal proxy values of metrics 1 and 2 have been designated and their equivalence to the optimal operating metrics validated;
  d. the common range and interval for the X and Y axes of proxy values 1 and 2 have been specified, delineating a rectilinear matrix called a matched array;
  e. every point at which proxy value x equals proxy value y represents an optimal or equilibrium state of the underlying operating system;
  f. the range of values at which x=y designates the center diagonal of the matched array, called an "alignment vector."

The alignment computer generates a matched array display at block 313, including a matrix of feasible intersection points in the array of X and Y values, and a diagonal "alignment vector" of all intersection points for which the proxy value of x equals the proxy value of y. For any embodiment of the system in which the conditions and optima remain generally the same, this setup process is implemented once and its results will apply to all reasonably similar cases, in much the same way the settings on an instrument gauge are calibrated to reflect the known parameters and limits of the system being measured, then applied to all instruments produced, and used in all reasonably foreseeable operating conditions.

Figure 4:
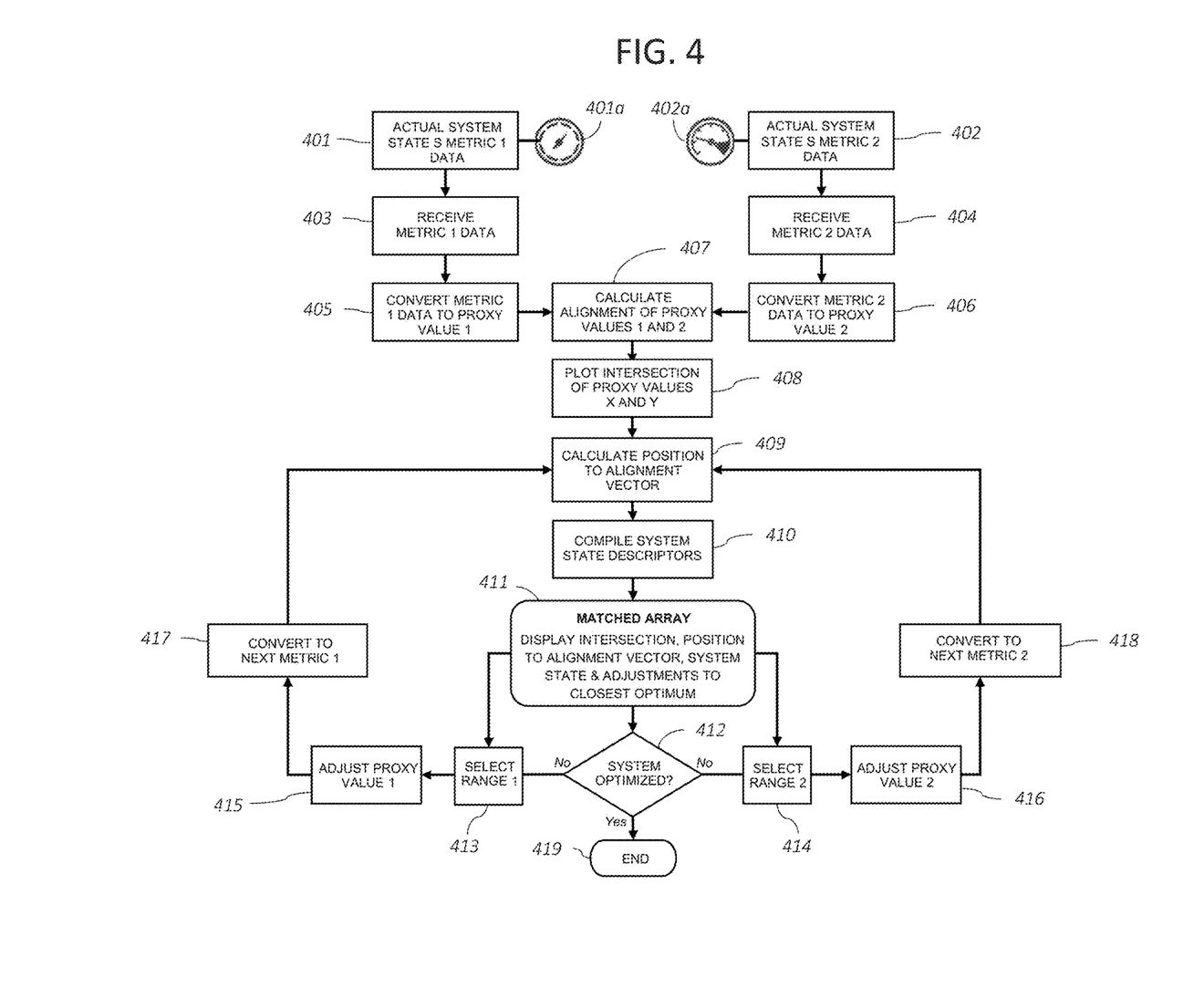
FIG. 4 is a flow chart that depicts a process in which there are inputs to and outputs from a matched array system, wherein an output from the matched array system (e.g., shown on a display device) is a set of instructions a user can follow to adjust system variables to achieve "normative" optimization, according to an embodiment.

FIG. 4 shows an embodiment of the matched array system that generates instructions an operator can follow to reach a desired target state in the underlying operating system. These instructions are not implemented by the system, but represent the "normative" series of prescriptive adjustments a system operator should follow to achieve the target state as it responds to changing metric 1 and metric 2 data received. The matched array system in such an embodiment shows one or multiple steps that move from a current position toward the alignment vector. Because the alignment vector represents proxy-operating equivalence, these steps represent provisional changes that move toward optimization in the underlying operating system.

Actual operating metrics data generated by the underlying system 401 and 402 are displayed in an embodiment on the meters 401a and 402a. The alignment computer receives metric data 1 and 2 in blocks 403 and 404 in an embodiment and converts them in steps 405 and 406 to their respective proxy values. The alignment computer then calculates alignment between proxy values 1 and 2 at step 407, generating the matched array. The matched array system then plots the intersection of these values on the matched array at step 408. The matched array system then calculates at 409 the position of the resulting intersection in relation to the alignment vector on the matched array. The distance and direction of the plotted position relative to the alignment vector reflects the state of the system and the effort and direction required to achieve proxy value alignment which signals optimization or equilibrium in the underlying operating system. The matched array system state monitor (e.g., software executing on the same computing device as the matched array system) generates a compilation of system data at 410, creating a complete picture of system performance and status for review and interpretation by the system operator.

In alternate embodiments, the system state monitor 410 can show system state and performance in the form of a colored light, with different colors indicating the degree of system stability, risk, or other dimensions of performance. A more complex system state indicator on the matched array 411 can, in various alternate embodiments, generate detailed lists of original metrics, proxy values, implicated stability metrics (e.g., temperature or pressure limits approached or exceeded), recommended rate and direction of change, degrees of adjustment needed, as well as the estimated speed and time to recovery or attainment of optimization in the underlying system. The matched array system continually checks if an optimum is attained at step 412 by comparing plotted values to the alignment vector values. In an embodiment, the matched array system continues to evaluate the relative values of system variables at steps 413 and 414 to determine which is closer to the alignment vector, potentially offering the more efficient path to alignment.

Further to FIG. 4, and acting on this information, the matched array system generates normative adjustments 415 and 416 in values for proxy values 1 and 2. In an embodiment, the matched array system receives the adjusted data 415, 416 and converts the updated proxy values to new actual system metrics 417 and 418. The projected results of making such normative adjustments will be reflected in changes in position relative to the alignment vector 409. The system can continue to iterate until projected optimization threshold value is reached at step 412, at which time the matched array system will cease proposing adjustments and come to rest at 419. In this normative mode, actual changes to the actual underlying operating environment will only have been made as a result of specific actions the system operator executes in response to the matched array system instructions.

Figure 5:
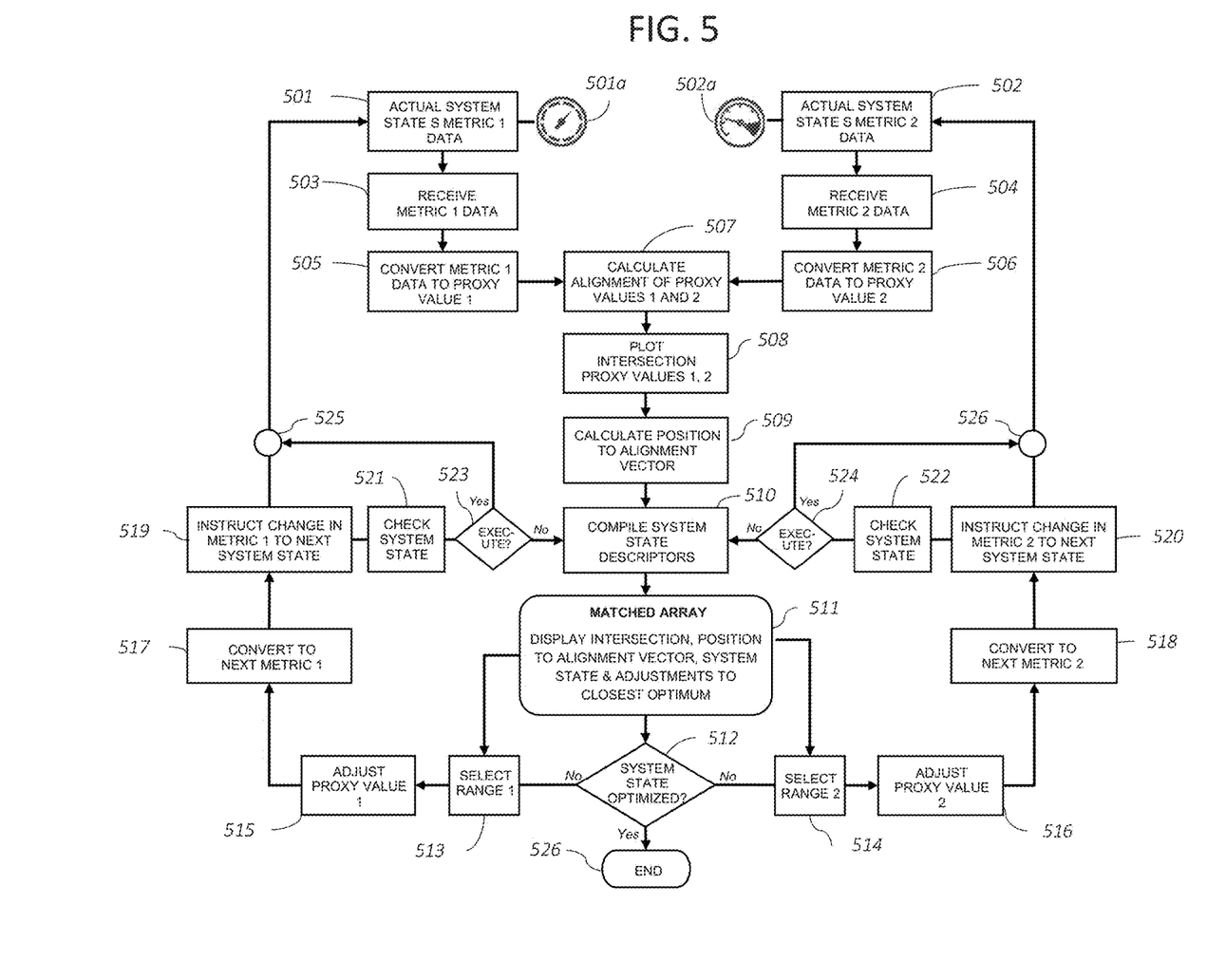
FIG. 5 is a flow chart depicting a process in which a matched array system directly instructs the physical system to take the actions dictated by the matched array position, thus automatically moving the physical system toward "positive" optimization, according to an embodiment.

Continuing to FIG. 5, note that the series of actions 501 to 518 are identical to those at blocks 401 to 418 in FIG. 4, encompassing all activities from the initial system metrics, to conversion and rendering on the matched array display, to the determination of proxy value adjustments needed to achieve optimization, and the conversion of these proxy values to updated operating metrics. Whereas the embodiment pictured in FIG. 4 stopped with directional instructions to a system operator, FIG. 5 illustrates an embodiment of the matched array system that further instructs the actual operating system to make specific underlying system adjustments consistent with approaching, and eventually reaching, the alignment vector on the matched array. Specifically, the matched array system instructs changes to underlying metrics 1 and 2, respectively, at steps 519 and 520 in line with the proxy value adjustments indicated in the matched array. In an embodiment as shown in FIG. 5, the instruction is issued but not acted upon until an operator checks the system state indicator displays 521 and 522 to view any changes that may have taken place since prior changes or from the initial state, and to review the projected impact of instructed adjustments 519 and 520 before they are executed by the matched array system.

Further to FIG. 5, in an embodiment, the system operator activates one or more switches 523 and 524, releasing the system (Yes, or preventing release, No) to make the system-proposed adjustments. If the switches are shifted to No, then the system takes no action other than to update state indicator display 510 which also captures any other changes in the system state. Alternatively, in such an embodiment, if the system operator releases the system at 523 and 524, the matched array system executes the instructions 519 and 520, and these directives are implemented in the operating system, working through the metric 1 and metric 2 actuators (or a related mechanism) 525 and 526. These adjustments generate actual system changes that move the system to a new state, causing the system to update metrics data 501 and 502. In this embodiment, the matched array system continues to receive and process actual system data, processes this information relative to proxy values, and iterates closer to the alignment vector as long as this is unimpeded by an operator instruction or internal system rule that interrupts or counters the system operation. The system will continue to process instructions to new positions in the matched array display 511, continually tracking plotted positions relative to the alignment vector. In an embodiment, the matched array system will iterate to an optimized state until the alignment vector is reached, meaning proxy value x=proxy value y, causing the switch 512 to acknowledge optimization, and ending the cycle at system stopping point 526.

Next is an application of the matched array system and alignment vector technologies applied to a critical use case of aircraft flight. Experts have argued that most pilots do not understand the relationship between airspeed and angle of attack, as evidenced by the high incidence of "loss of control" flight accidents. Angle of attack (AOA) is the angle between the oncoming air and a reference line along the fuselage or wing of an airplane. On takeoff, the pilot pulls back on the control stick or wheel to lift the nose of the aircraft so angle of attack relative to oncoming wind maximizes lift at a given airspeed. The amount of lift needed for an aircraft to achieve takeoff, to stay in flight, to maneuver, and to land, is directly related to the interaction of AOA and airspeed. While other variables enter consideration (weight which is constantly changing as fuel is consumed, aerodynamic drag, and forces exerted due to maneuvers), the "angle of attack challenge" refers to the criticality of maintaining the proper relationship between the airspeed and AOA to control lift so the aircraft gains altitude, stays aloft, or loses altitude in a controlled fashion (as in landing) as the pilot intends. The correct combinations of airspeed and AOA are essential to safe flight. When the angle of attack is too steep at a given airspeed, there is insufficient lift, resulting in a stall. Alternatively, if the angle of attack is correct, say nose down for landing, but airspeed is insufficient to maintain lift, a stall can also be precipitated causing loss of control. Accordingly, airspeed and AOA are two variables that move in tandem with one another to achieve optimal or equilibrium flight performance. Being able to visualize and adjust both together in a single instrument, as in the matched array system, would potentially avoid many loss of control accidents that occur due to the pilot's excessive focus on one instrument or flight condition (speed or AOA), rather than both together.

Figure 6:
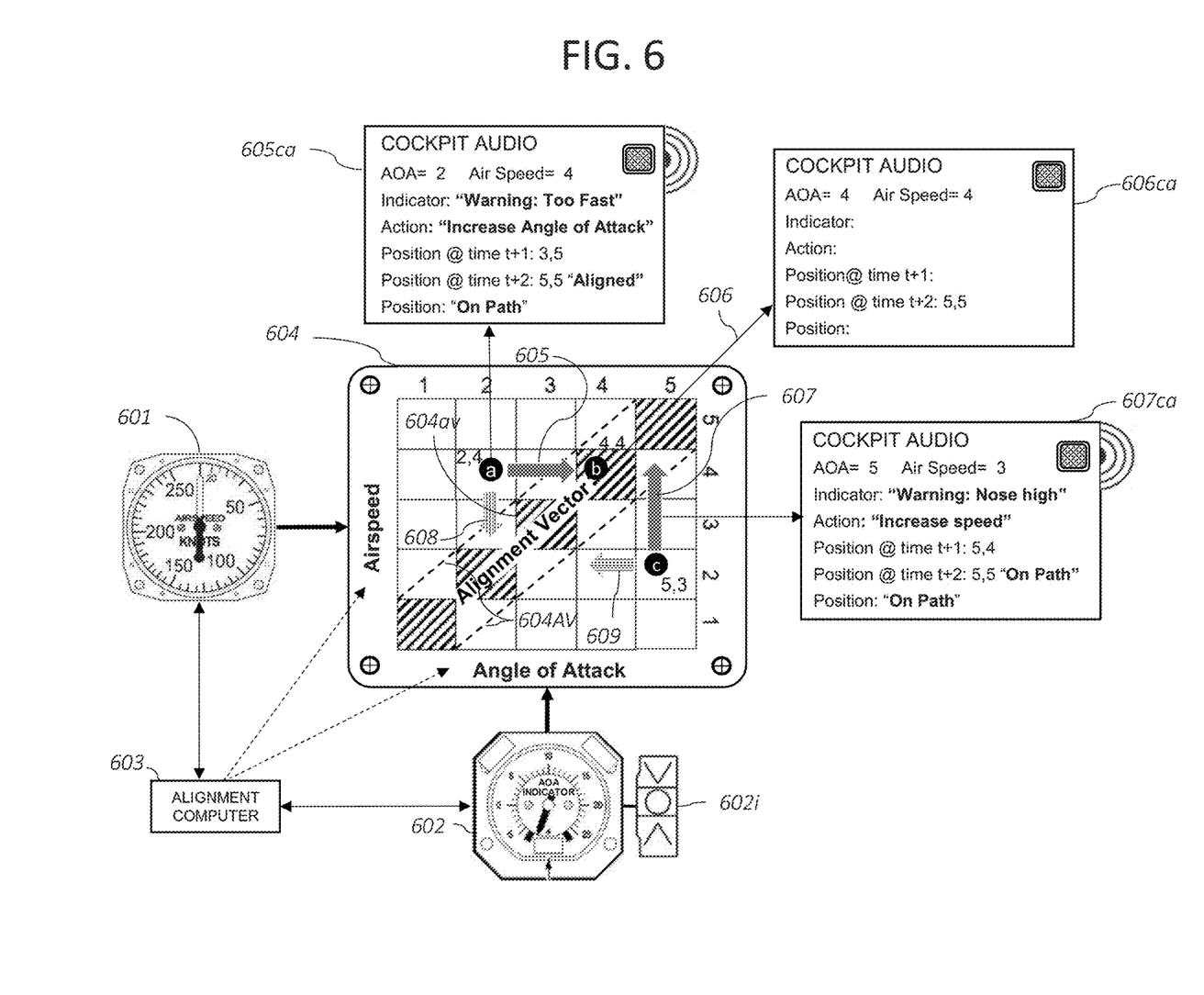
FIG. 6 illustrates an example use case for a matched array system configured according to an embodiment involving the coordination of aircraft airspeed and angle of attack.

FIG. 6 is an embodiment of matched array and alignment vector technologies applied to the combination of airspeed and AOA in a single display, enabling assignment of jointly-optimal values for both variables along the alignment vector. Among the instruments customarily installed in modern aircraft are an airspeed indicator 601 and an AOA indicator 602. The latter is sometimes accompanied by an AOA index meter 602$i$, a simple, color-coded up, down, and on-target indicator to guide the pilot to increase, decrease, or hold angle of attack to prevent a stall at a given airspeed. Airspeed and AOA already represent electronic signals that can be translated into digital inputs using the physical system process described in FIG. 1. An alignment computer 603 implements the alignment computing process outlined in FIG. 3, setting the axes on the matched array, and establishing the alignment vector. The range of possible airspeeds and safe angles of attack are specific to the aircraft and its operating envelope. They will already have been established and incorporated in the individual airspeed and AOA instruments by a system designer, and the relevant range of each variable is input to the matched array system to generate the aligned values for which takeoff, level flight, and final approach/landing scenarios are identified. Accordingly, the axes on the matched array display 604 show the proxy values x and y corresponding to the airspeed and AOA relevant to the aircraft, and applicable to achieving combinations of airspeed and angle of attack consistent with controlled flight.

Continuing with FIG. 6, an airspeed/angle of attack matched array system 604 is shown, along with a set of airspeed and AOA plotted positions a, b, and c. These positions are associated with cockpit audio announcement scenarios shown in the surrounding panels 605$ca$, 606$ca$, and 607$ca$. Each scenario represents an actual airspeed-AOA combination shown on individual instruments and represented together by a plotted position based on proxy values on the matched array. In an embodiment, alignment vector 604$av$ represents the combinations of airspeed and angle of attack consistent with controlled flight, and 604AV identifies an expanded alignment vector inclusive of approximations around the specific cells 604$av$ for which controlled flight is achieved as well. At position 'a,' airspeed proxy value is 4 and angle of attack proxy value is 2. Vector 605 shows a direction and range of needed adjustment that is sufficiently far from the alignment vector that cockpit annunciator 605$ca$ issues a warning with the instruction to increase angle of attack. In this embodiment, the system emits an audible warning over cockpit audio, "Warning: Too Fast," indicating too high a speed for the AOA setting, and recommending a steeper angle of attack. Alternatively, or in addition to an audible warning and/or visual warning, a control signal may be generated to provide tactile or other mechanical sensory signals, such a vibration of the pilot control stick—a "stick shaker" warning—or vibration of the pilot seat, to provide a warning as to the deviation from the alignment vector. At position 'b,' airspeed and AOA are aligned and no adjustment is needed, so the cockpit audio system 606$ca$ does not issue any correction. At position 'c,' by contrast, the AOA is quite steep, and the airspeed too relatively slow for safe flight. As a result, the matched array system 604 causes the cockpit audio system to issue an example warning at cockpit audio 607$ca$, signaling a "Warning: Nose High" condition and the associated announcement 607$ca$ to "Increase Speed."

Further to FIG. 6, arrows 608 and 609 indicate alternative pathways to returning to the alignment vector, by either reducing airspeed at vector 608 for a given angle of attack (for example, during landing) or decreasing AOA along vector 609 at a given airspeed (to maintain level flight). Which pathway represents the preferred course of action depends on the specifics of the situation. In either case, returning to the alignment vector on the matched array provides the appropriate normative guidance to the pilot on how to avoid a loss of control or return the aircraft to stable flight.

In the warning scenarios pursuant to the embodiment described, the priority of direction (to adjust airspeed or AOA) can be predetermined by the value of the metric or according to the specifics of the scenario (e.g., nose down and slowing speed for final approach and landing might prioritize AOA adjustment vs slower speed). This use case follows the normative mode of operation in which instructions are issued and no automated action taken by an associated control system. In an alternate embodiment, the matched array system can operate in positive mode, sending actual instructions to the aircraft flight control system or autopilot to actually make the indicated adjustments to the aircraft flight control surfaces. Existing aircraft autopilot systems perform this function today, automatically calculating airspeed and receiving AOA data (from instruments mounted on one or both sides of the fuselage), and adjusting either metric based on aircraft design features, specific flight characteristics, and the relevant flight conditions. However, autopilots have no corresponding display of the matched characteristics of AOA and airspeed to inform pilots of the conditions the autopilot is responding to, or to enable them to visually monitor the rate and direction of adjustment to confirm that the autopilot is adjusting the preferred metric in the desired direction to achieve and maintain flight control.

Figure 7A:
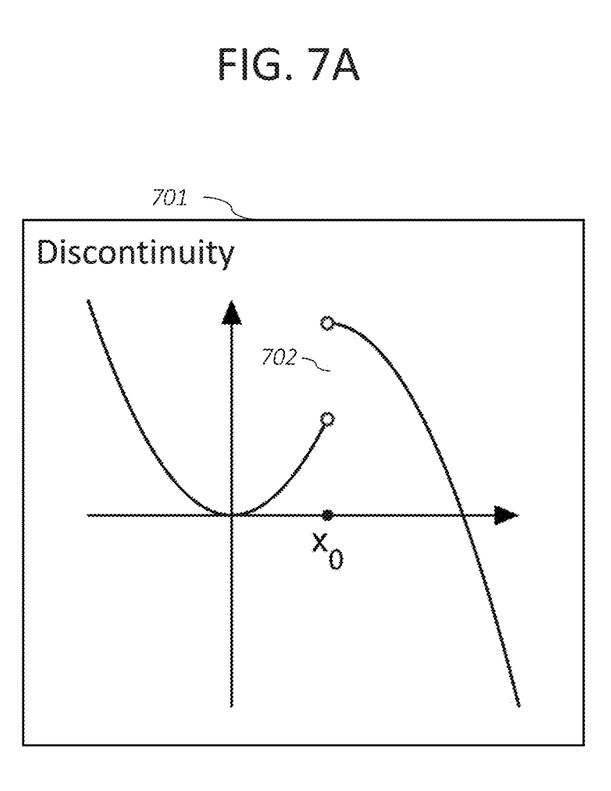
FIGS. 7A and 7B show examples for discontinuous and nonlinear reversions where a synthetic approach may be useful to calculate and display alignment.

FIG. 7A shows one sample class of system behavior the synthetic approach to displaying alignment is designed to address. The illustration 701 shows a classic discontinuity in which the same value of xo has two different y values. The gap 702 represents the discontinuity. A similar discontinuity exists at different y values where there may be more than one x value as well.

Figure 7B:
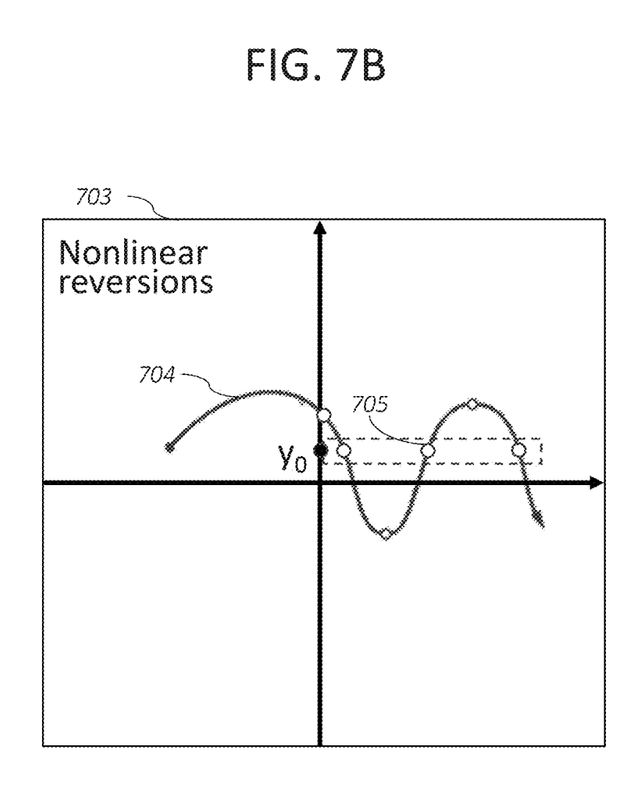

In FIG. 7B, the illustration 703 represents the case of nonlinear reversions in which the fluctuating curve 704 maps out multiple x values 705 for the same value of $y_0$, but encountered at different times in the life of the process being illustrated. The challenge, then, is how to display alignment—the unique correspondence between x and y that exists at a point in time—when x and y can have multiple values as a result of the presence of these types of discontinuities and reversions.

Figure 8:
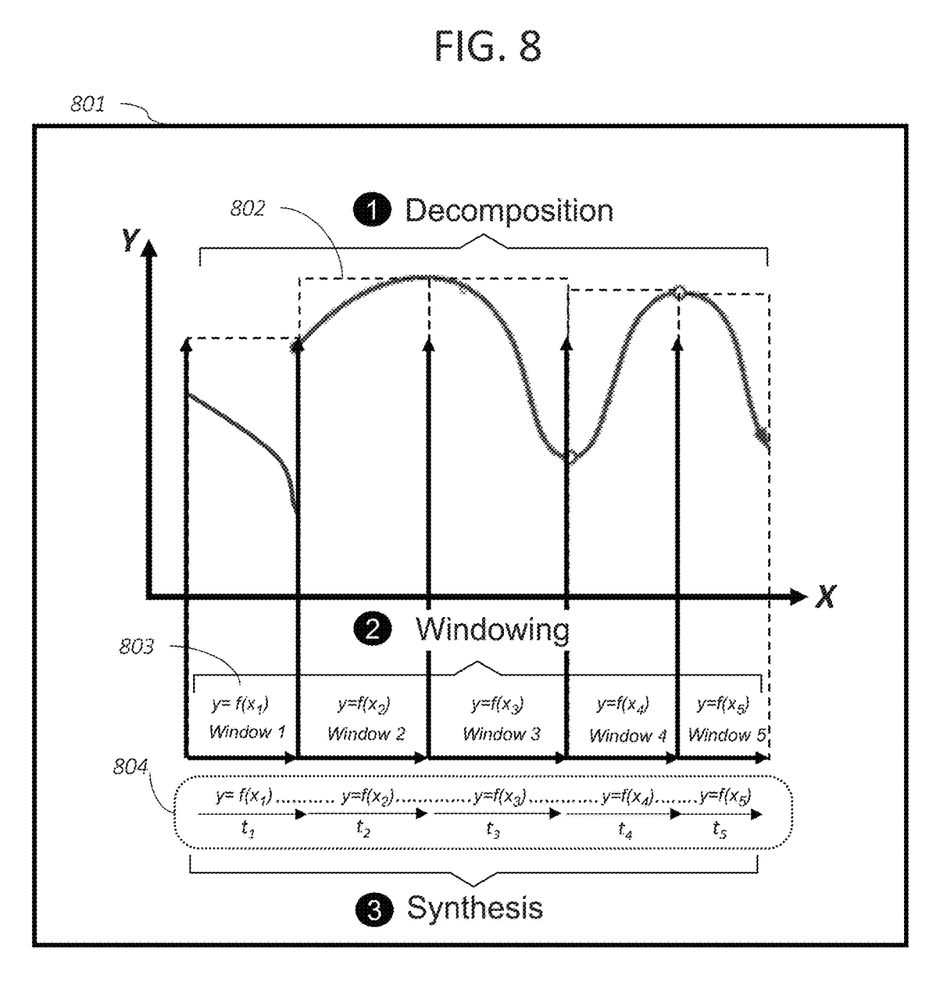
FIG. 8 illustrates an embodiment where decomposition, windowing, and synthesis are applied to arrays over discontinuous and nonlinear reversion flight trajectories.

FIG. 8 illustrates in an embodiment, a method of addressing the presence of discontinuities and nonlinear reversions in a way that results in discrete values of x and y that can then be modeled to support achieving and sustaining alignment. The synthetic method 801 begins with decomposition of the profile of the system into segments that do not contain discontinuities or reversions. Each of the decomposed segments 802 frames a portion of the curves that have no such discontinuous or reverted profiles, and as many of these decomposed segments can be created as needed. Note that the segments shown are taken with respect to the x axis, as there are multiple values of x for a given y. If reversions or discontinuities occur such that multiple values of y exist for a given x, then decomposition into segments can also be undertaken with respect to the y axis. The lifecycle of the system can be decomposed into as many segments as needed to account for all discontinuities and reversions.

Further to FIG. 8, the second step in the process of synthesis takes each decomposed segment and defines it as a two-dimensional "window" embodying a discrete function reflecting the behavior of y with respect to x in the decomposed segment. Whereas decomposition delineates one-dimensional segments, windowing frames the segments as functions 803 for each window, defining the relationship between x and y in each. For purposes of alignment, each of these windows may show the operation of the system at x and y values to represent target, desired, or optimal values— the values that alignment is directed to reflect to ensure system or process stability.

Continuing with FIG. 8 shows synthesis, the third and final step in representing discontinuous and reversion functions for purposes of displaying alignment. Synthesis combines the individual windows into a series of functions that together represent the subject process or system 804 over the life of the process. Individual window functions start and end with the passage of time represented by the horizontal arrows $t_n$, and these are linked according to how the system functions.

Figure 9:
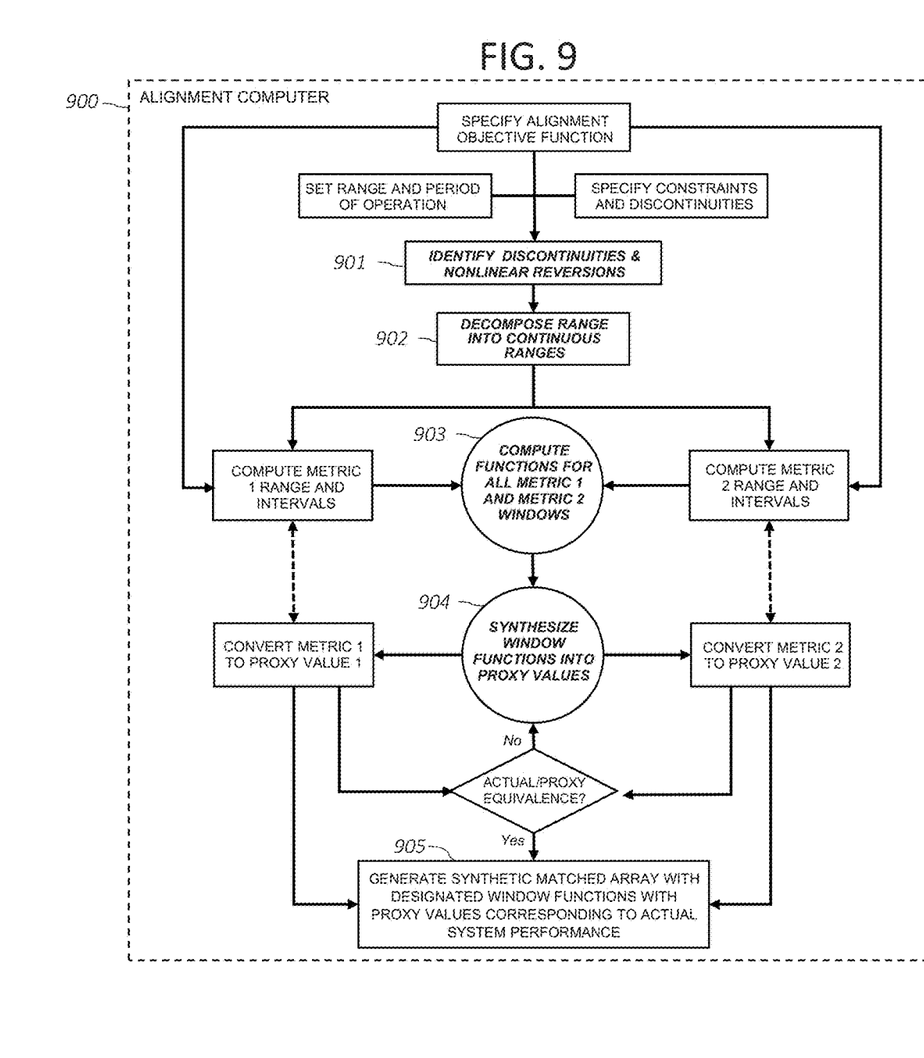
FIG. 9 is a process flow diagram according to an embodiment portraying the alignment computation process of FIG. 3, adjusted to apply the synthetic method to discontinuous and nonlinear reversion scenarios.

FIG. 9 is a flow diagram similar to that of FIG. 3, but updated to reflect the matched array computational process for synthetic computations. Specifically, steps 901 to 905 have been updated to reflect the synthesis method. Step 901 identifies all discontinuities and nonlinear reversions that need to be addressed to apply alignment analysis to the subject process flow. Such instances are then decomposed in step 902 into continuous ranges to identify where discontinuities and reversions need to be addressed. The next step 903 computes the functions that define the relationships between metric 1 and metric 2, forming the distinct windows of activity that apply to the process. Finally, those window functions are synthesized in step 904 into a continuous representation of the system as a series of linked window functions.

Further to FIG. 9, the synthesized function in the matched array represents the end-to-end process for which resulting values for x and y are proxies for actual metric 1 and metric 2, arranged in such a way that they generate a matched array in step 905. The values in the matched array represent the range of feasible combinations of metric proxy values of x and y. For purposes of alignment, all of the proxy values in the matched array that may be considered "desired," "target," "efficient," or "optimal" constitute the alignment vector of the synthesized array. Given the importance of aircraft fuel efficiency, the potential to prioritize flight metrics that together optimize fuel consumption is a high-value application of the flight alignment technology. For example, selecting and managing flight routing, altitudes, and rates of ascent and descent all have significant impacts on fuel economy. The alignment vector designated in the embodiment of FIG. 3 consisted of all points for which proxy values for x equaled proxy values for y, forming a linear diagonal vector. In the case of discontinuous and nonlinear systems, which may be handled with the process of FIG. 9, the alignment vector of target values can be nonlinear, and located anywhere in the matched array.

Figure 10:
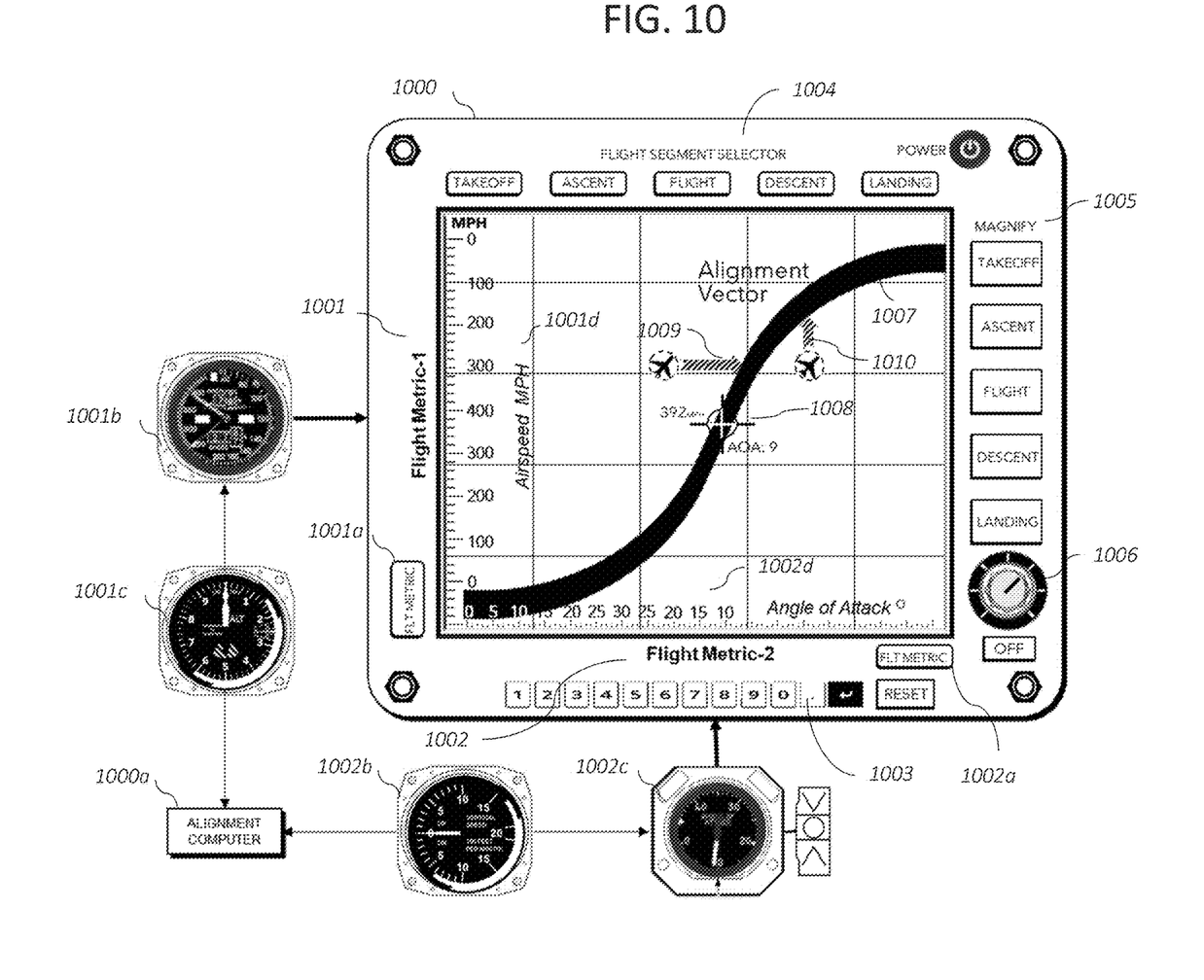
FIG. 10 shows an embodiment of a matched array aircraft flight alignment system display device for a discontinuous flight path as an aircraft moves through the five windows of takeoff, ascent, level flight, descent, and landing.

FIG. 10 shows an embodiment of synthetic matched array technology applied to representing the flight of an aircraft from takeoff to landing. The context is a flight alignment instrument display 1000 representing the interaction of any two variables relevant to the subject flight, such as airspeed and angle of attack, or altitude and airspeed, etc. Such a use case provides value to the pilot and co-pilot by providing a visual basis for quickly assessing whether the combined selected settings for position, altitude, speed, and attitude (collectively, the state) of the aircraft are within safe or desired ranges. This is of special value, for example, during long trans-oceanic flights during which loss of contact with standard navigational systems due to distance from customary beacons, combined with blindness to visual cues due to darkness, requires extra diligence and continuous understanding of the aircraft's changing state at all times.

The following are exemplary components, features, and functionality of the flight alignment instrument 1000 pursuant to design principles and engineering capabilities of synthetic matched array technology:

a. Alignment computer. The alignment computer 1000a computes the target relationships between the selected metrics, generating the matched array and alignment vector corresponding to actual system performance. Upon selection of the metrics to be entered using switches 1001a and 1002a, or other input devices, and the system uploads the corresponding computed metrics and relationships. Data from the aircraft's flight navigation system can also be uploaded to the flight alignment system directly.

b. Flight metric 1. The aircraft will already be equipped with digital or electromechanical instruments for airspeed 1001b and altitude 1001c, for example, and the same signal feeds informing these instruments can be used to provide data feeds to the flight alignment instrument. The display screen scale 1001d can show the actual scale of the metric or a proxy value such as 1, 2, 3, etc. Further, symbols or lights can be deployed to show progress along the instrument scale consistent with the progress of the flight. If actual metric data is shown the scale will increase and then decrease as it is read from bottom to top, in line with the increase in speed to level flight and decrease to descent and landing. Flight metric 1 data may be input using keyboard 1003, or other input device, such as a touch screen interface or voice interface.

c. Flight metric 2. This axis captures the alternate metric the pilot may wish to coordinate with flight metric 1, and is selected using flight metric selector switch 1002a. Shown by way of example are options for vertical air speed 1002b and angle of attack 1002c instruments, and the digital or electromechanical feeds to these instruments supply data to the flight alignment instrument as well. The metric scale for this axis of the array can also consist of actual or proxy values, or symbols for progress or the passage of time. Flight metric 2 data may be input using keyboard 1003, or other input device.

d. Flight segments. Segments of the flight are selected so as to avoid discontinuities or reversions, resulting in a smooth contour suitable to use in composing the alignment vector. To achieve this, the flight may be divided into five windows 1004: takeoff, ascent, flight, descent, and landing. Pressing the segment selector button causes the screen to display that segment across the entire screen. In addition, 1005 provides variable magnification for each flight segment, with the degree to magnification controlled by a manual dial 1006.

e. Alignment vector. The flight alignment system instrument supports unambiguous interpretation of flight management parameters, and part of its utility is the ability to combine actual metrics and user-friendly forms to facilitate safe and intuitive flight. The alignment vector 1007 is the product of both the alignment computer calculations and an intuitively-designed user interface that illustrates the overall contour of the flight (as reflected in the up, level, down stages) using an S-curve design. Alignment computer correlations between the selected flight metrics are mapped to this alignment vector 1007, and the specific location of the current flight state is identified by an indicator shown as the crosshair marker 1008. Indicators identify when the aircraft is not on the alignment vector. For example, the airplane-arrow icon 1009 shows the aircraft flying at an angle of attack (relative to the x axis) that is too steep to remain on the alignment path, and identifies the direction in which flight changes can be made such that alignment can be attained. Similarly, airplane-arrow icon 1010 indicates the airspeed is too slow to remain on the alignment vector, and the direction and amount of adjustment are reflected by the position and length of the arrow.

The following describes the general features and functionality of an embodiment of the flight alignment system 1000. In an embodiment:

a. The alignment vector can track the end-to-end flight trajectory of the aircraft, providing a visual reference to the relationship between key flight metrics throughout flight. Safety and control resulting from more rapid assessment of multiple data points is a primary objective. Additionally, flight alignment can be used to assist pilots in achieving greater fuel efficiency by enabling compliance with the best "fuel-efficient flight trajectory."

b. The alignment vector itself is a visual reference point to the desired range of values for key flight metrics. It can either be a straight-line diagonal in the matched array, or made more closely attuned to the flight parameters. In the example provided, the S-curve configuration maps to the "shape" of the flight's five core stages: takeoff, ascent, level flight, descent, and landing.

c. The system is designed to issue warnings and prompts if the position of the matched array strays too far from the alignment vector. The warning distance is adjustable, and the means of prompting action can be electromechanical (for example, "stick shaker" or other means), audio, or visual through integrated or separate flashing lights, or a combination of such prompts. The magnitude or intensity of the prompts may be increased or decreased automatically in relation to the deviation from the alignment vector, a feature that may serve as a type of warning system.

d. Segmentation of the flight trajectory balances the elimination of discontinuities on the one hand, and designation of meaningful segments from the perspective of utility to the user. When the achievement of intuitive user meaning is at odds with where decomposition needs to take place for the elimination of discontinuities, the scope of decomposition can be deepened to add breakdowns that can then be reassembled into segments that have more meaning to users.

e. Magnification of flight segments is designed to enable pilots to view the details of alignment in any segment of the flight. Magnification can be set at a fixed level, increased or decreased manually, and triggered automatically during portions of flight based on preset conditions.

f. The flight alignment system can accept details of the flight plan directly from the aircraft navigation system, or details can be input manually. Further, adjustments can be made through uploads from the autopilot. The system can also be integrated with real-time navigation to update the alignment system to adjust to changes in the flight plan (e.g., for avoidance of weather systems or air traffic congestion).

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A method for displaying, in a two-dimensional array, combinations of aircraft flight metrics, the method, implemented on a system including at least one display device and at least one input device, comprising:
- displaying cells of the array on the at least one display device;
- displaying, on the display device, an X-axis of values of the array and a Y-axis of values of the array;
- receiving, by the at least one input device, an input of a first flight metric;
- scaling the first flight metric into a first flight metric proxy value;
- receiving, by the at least one input device, an input of a corresponding second flight metric;
- scaling the second flight metric into a second flight metric proxy value; and
- on the at least one display device, displaying, in a cell of the array that corresponds to an intersection of the first flight metric proxy value and the second flight metric proxy value, an indicator that visually indicates a distance between the cell and an alignment vector,
- wherein the alignment vector is defined by cells or portions of cells of the two-dimensional array which represent a desired range of the combinations of the first and second flight metric proxy values for at least a portion of the aircraft flight.

2. The method of claim 1, wherein the display is divided into segments corresponding to stages of the aircraft flight.

3. The method of claim 2, wherein the segments of the aircraft flight correspond to takeoff, ascent, level flight, descent, and landing.

4. The method of claim 2, wherein the first and second flight metric proxy values are matched to display the applicable ranges of flight metric values that correspond to each aircraft flight segment.

5. The method of claim 4, wherein the ranges of X and Y reflect the passage of time or measures of progress along the aircraft flight.

6. The method of claim 2, wherein the group of cells displaying combinations of first and second flight metric proxy values corresponding to stages of the aircraft flight are presented as distinct windows enabling enhanced visibility into portions of the display.

7. The method of claim 6, wherein each window can be independently focused, magnified, or diminished to enhance the visibility of all or a portion of the two-dimensional array.

8. The method of claim 1, wherein the indicator visually indicates whether the cell is within the alignment vector.

9. The method of claim 1, further comprising prompting a user to change one or both of the first flight metric and the second flight metric.

10. The method of claim 1, wherein the cell is a first cell, the method further comprising:
- receiving, by the at least one input device, an input of an updated first flight metric;
- applying the first scaling value to the updated first flight metric to convert the updated first flight metric into an updated first flight metric proxy value;
- removing the indicator from the first cell;
- on the at least one display device, displaying, in a second cell of the array, an updated indicator that visually indicates an updated distance between the second cell and the alignment vector,
- wherein the second cell corresponds to an intersection of the updated first flight metric proxy value and the second flight metric proxy value.

11. The method of claim 10, wherein the updated indicator indicates whether the second cell is closer to or farther away from the alignment vector than the first cell.

12. The method of claim 10, wherein the updated indicator indicates that the second cell is within the alignment vector.

13. The method of claim 1, wherein the cell is a first cell, the method further comprising:
- receiving, by the at least one input device, an input of an updated second flight metric;
- applying the second scaling value to the updated second flight metric to convert the updated second flight metric into an updated second flight metric proxy value;
- on the at least one display device, displaying, in a second cell of the array, an updated indicator that visually indicates an updated distance between the second cell and the alignment vector,
- wherein the second cell corresponds to an intersection of the first flight metric proxy value and the updated second flight metric proxy value on the X-axis and the Y-axis.

14. The method of claim 13, wherein the updated indicator indicates that the second cell is closer to or farther away from the alignment vector than the first cell.

15. The method of claim 13, wherein the updated indicator indicates that the second cell is within the alignment vector.

16. A method for determining and displaying a first flight metric value and a second flight metric value of an aircraft in a two-dimensional array, the method comprising:
- displaying on a display device the two-dimensional array as a plurality of cells, wherein each cell of the plurality corresponds to a different set of values of a first flight metric and a second flight metric of the aircraft;
- receiving, in a first input, a value for the first flight metric and a value for the second flight metric of the aircraft;
- scaling the value of the first flight metric of the first input to a first flight metric proxy value;
- scaling the value of the second flight metric of the first input to a second flight metric proxy value;
- determining a first cell of the plurality of cells that corresponds to the first flight metric proxy value and the second flight metric proxy value;
- providing, within the first cell, a visual indicator indicating that the first cell is not within an alignment vector, wherein the alignment vector is defined by cells or portions of cells of the two-dimensional array which represent a desired range of first flight metric proxy values and second flight metric proxy values;
- receiving, in a second input, a value for the first flight metric and a value for the second flight metric, wherein at least one of the values for the first flight metric and the second flight metric is updated from the first input to the second input;
- scaling the value of the first flight metric of the second input to an updated first flight metric proxy value;
- scaling the value of the second flight metric of the second input to an updated second flight metric proxy value;
- after receiving the second input, determining a second cell of the plurality of cells that corresponds to the updated first flight metric proxy value and the updated second flight metric proxy value; and providing, within the second cell, a visual indicator indicating whether the second cell is within the alignment vector.

17. The method of claim 16, wherein the visual indicator of the second cell indicates at least one of the direction and distance of adjustment required for the second cell to be within the alignment vector.

18. The method of claim 16, wherein the visual indicator of the second cell indicates whether the second cell is closer to or farther away from the alignment vector than the first cell.

19. The method of claim 16, where a further second input is continuously received at least until the second cell is within the alignment vector.

20. The method of claim 16, further comprising the step of generating one or more of a visual prompt, an auditory prompt and an electro-mechanical prompt to change one or both of the first flight metric and the second flight metric of the first input.

21. A method for calculating and displaying, in a two-dimensional array, a trajectory of the flight of an aircraft with respect to a desired trajectory of the flight of the aircraft, the method comprising:

displaying on a display device the two-dimensional array as a plurality of cells, wherein each cell of the plurality corresponds to a different set of values of a first flight metric and second flight metric of an aircraft;

segmenting the two-dimensional array into windows corresponding to combinations of first flight metric and second flight metric proxy values for all or a portion of the segments of the aircraft flight;

entering desired combinations of first flight metric values and second flight metric values for any or all segments of the aircraft flight, based on an alignment vector that defines the desired combinations;

scaling the values of the desired combinations of first flight metric values and second flight metric values into respective desired combinations of first flight metric proxy values and second flight metric proxy values;

calculating and displaying, based on the combinations and desired combinations, the trajectory of the aircraft flight and the desired trajectory of the aircraft flight.

22. The method of claim 21, wherein the desired combinations are determined based on input from an aircraft flight planning system.

23. The method of claim 21, wherein the first and second flight metric values are input into an aircraft autopilot system.

24. The method of claim 21, wherein the trajectory of first and second flight metric proxy values are stored and indexed for future access, retrieval, and uploading.

\* \* \* \* \*